United States Patent
Jacobi et al.

(10) Patent No.: US 6,584,095 B1
(45) Date of Patent: Jun. 24, 2003

(54) METHOD AND SYSTEM FOR SUPPORTING WIRELESS COMMUNICATIONS WITHIN AN INTERNETWORK

(75) Inventors: Eli Jacobi, Palo Alto, CA (US); Markku Korpi, Starnberg (DE); Peter Kozdon, Santa Clara, CA (US)

(73) Assignee: Siemens Information & Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/057,352

(22) Filed: Apr. 8, 1998

(51) Int. Cl.[7] .......................... H04L 12/56; H04L 12/66
(52) U.S. Cl. ........................... 370/352; 370/389
(58) Field of Search ............................... 370/389, 352, 370/390, 355, 386, 485, 400, 354, 356, 261, 401, 404

(56) References Cited

U.S. PATENT DOCUMENTS

| | | | |
|---|---|---|---|
| 5,590,175 A | | 12/1996 | Gallant et al. ............... 379/58 |
| 5,592,154 A | * | 1/1997 | Lin et al. ................. 340/825.5 |
| 5,659,544 A | | 8/1997 | La Porta et al. ............ 370/312 |
| 5,726,984 A | | 3/1998 | Kubler et al. |
| 5,845,090 A | * | 12/1998 | Collins, III et al. .... 985/200.51 |
| 6,011,792 A | * | 1/2000 | Miloslavsky ................ 370/352 |
| 6,075,783 A | * | 6/2000 | Voit ........................... 370/352 |
| 6,119,003 A | * | 9/2000 | Kukkohovi .................. 455/435 |
| 6,125,113 A | * | 9/2000 | Farris et al. ................ 370/389 |
| 6,134,587 A | * | 10/2000 | Okanoue .................... 709/222 |
| 6,205,139 B1 | * | 3/2001 | Voit ........................... 370/389 |
| 6,208,639 B1 | * | 3/2001 | Murai ......................... 370/356 |

FOREIGN PATENT DOCUMENTS

| | | |
|---|---|---|
| EP | 0 758 189 A2 | 2/1997 |
| EP | 0 828 398 A1 | 3/1998 |

OTHER PUBLICATIONS

Wong and Halsall "Mobile Computing in a LAN Environment," *IEEE*, pp. 1116–1120, May 1, 1994.

Eng et al. "A wireless broadband ad-hoc ATM local-area network," *Wireless Networks*, 1(1995) Jul., No. 2, pp. 161–173.

Cohen and Postel "IP Addressing and Routing in a Local Wireless Network," *IEEE*, pp. 626–632, 1992.

Mascoli et al. "Alternative Scenarios for Data Applications Via Internet-Mobile and DECT-ATM Interworking." *IEEE*, pp. 788–792, Jun. 11, 1995.

* cited by examiner

Primary Examiner—Alpus H. Hsu
Assistant Examiner—Toan Nguyen

(57) ABSTRACT

A system and method for supporting communications among multiple interconnected networks include assigning multiple dynamic telephony addresses to each wireless communication device that registers in more than one network. The networks assign the addresses independently of each other. When an incoming call is directed to a particular wireless device via a first network, if the wireless device is beyond the transmission range of the first network, a locate-wireless-communication-device message may be single-cast, multicast or broadcast to remote networks, with instructions to return dynamic telephony addresses assigned to the device. While the telephony addresses are different in each network, each wireless device is associated with a device identifier that is universally applied in the internetwork. Upon receiving a telephony address from a remote network, the address is stored in local memory at the first network, thereby allowing access for subsequent incoming calls.

15 Claims, 4 Drawing Sheets

METHOD AND SYSTEM FOR SUPPORTING WIRELESS COMMUNICATIONS WITHIN AN INTERNETWORK

BACKGROUND OF THE INVENTION

The present invention relates generally to communication systems using wireless communication networks, and more particularly to methods and systems for supporting wireless communication on local area networks (LANs).

DESCRIPTION OF THE RELATED ART

Operation of a wireless cellular communications network requires cooperation among a number of different elements. Wireless communication devices supported by these networks include cellular telephones, personal digital assistants (PDAs), and wireless computers. A base station is located within each cell of a cellular network for transmitting and receiving information to and from the wireless communication devices. Base station controllers are utilized to control clusters of base stations by providing the base stations with the information to transmit to mobile communication devices within the range of the base stations. Mobile switching centers route calls between base stations, other mobile switching centers, and the public switched telephone network.

Each mobile switching center is associated with a home location register and a visitor location register. The home location register stores the management data relating to all of the wireless communication devices in the network. The management data for any particular wireless communication device includes an international mobile station identity (IMSI), a profile of capacities and services of the wireless communication device, and the location of the wireless communication device within the cellular network.

Each wireless communication device is assigned to a particular home location register, and a subset of the IMSI assigned to the wireless communication device identifies the particular home location register to which the wireless communication device is assigned. If the wireless communication device visits a network other than its home network, it registers with the visitor location register of the visited network. When the wireless communication device is turned on in the visited network, the device's IMSI is requested and passed onto the visitor location register. Using the IMSI, the visitor location register obtains the information required for registration of the device from the home location register assigned to the wireless communication device. Once the device has registered with the visitor location register, the device can place and receive calls in the same manner as if the device were located in its home network. However, each time the wireless communication device enters a visited network, the registration process must be repeated.

Additionally, every time a wireless communication device is operated, the profile is transmitted from the home location register to the visitor location register associated with the mobile switching center of the cell in which the wireless communication device is located. The messaging traffic between the home location register and the visitor location register can limit the call traffic handling capacity of the wireless communication network, because several messages must be exchanged between the home location register and the visitor location register before a call can be completed.

U.S. Pat. No. 5,590,175 to Gallant et al. proposes a solution to the reduced call traffic capacity of prior art cellular network systems. The solution includes selectively eliminating the need to access the home location register for those calls made to a wireless communication device having a home location at the same base station that is receiving the calls from the public switch telephone network. The visitor location register includes the profile of each local wireless communication device that has registered with the visitor location register. The profile includes a home location register query flag which determines whether access to the home location register is required for a particular call. If the query flag indicates that no access to the home location register is required, then the profile contains sufficient routing information to complete the call. If, on the other hand, the flag indicates that call forwarding or roaming information is required, the home location register must be contacted to obtain this information.

Although the Gallant et al. patent provides a partial solution to the call traffic capacity diminishment of a cellular telephone network, the substantial volume of messaging traffic resulting from the visitor location register accessing roaming information or call forwarding information from the home location register leaves room for improvement over the current system.

What is needed is a method and system for improving the efficiency of call message handling in wireless communication networks.

SUMMARY OF THE INVENTION

A system and method for supporting wireless communications within an internetwork enable decentralization of the support of individual wireless communication devices by utilizing dynamic internetwork protocol telephony addresses and by selectively using single-cast, multicast and broadcast techniques. The telephony addresses are fixed within a particular network of the internetwork, but are "dynamic" with respect to the networks, since each network may assign a different telephony address to a particular wireless communication device.

The internetwork is formed of a number of networks that are linked to exchange messages, requests and other signals. The internetwork may be formed of interlinked networks of a single business entity. Each network includes a base station having a generally fixed transmission region with respect to supporting communications with wireless communication devices, such as cellular phones, pagers and personal digital assistants (PDAs). Each network further includes a call control unit, such as a router-server, for establishing communication links and for assigning a dynamic telephony address in response to a registration request from a particular wireless communication device. The registration request is received via the base station of the network and includes a device identifier which is specific to the wireless communication device. The device identifier is universally applied within the internetwork, but the dynamic telephony address is assigned independently of assignments within other networks of the internetwork.

In the preferred embodiment, the dynamic telephony addresses are internet protocol (IP) telephony addresses. If the particular wireless communication device enters the transmission regions of each of the base stations within the internetwork and transmits registration requests via each of the base stations, the wireless communication device may be assigned a number of dynamic telephony addresses equal to the number of networks. The registration request may be automatically triggered by the wireless communication device merely by activating the device within a transmission range, but other triggering techniques may be utilized.

Each network includes memory having stored data that is representative of associations between each device identifier and the dynamic telephony addresses assigned by networks to the wireless communication device to which the device identifier is specific. When an incoming call is directed to a wireless communication device via a call control unit, if it is determined that the device is not within the transmission region of that network, the memory is accessed to determine which remotely assigned dynamic telephony addresses are available. If the network in which the device resides is known and the dynamic telephony address assigned by that network is also known, a single-cast call-setup message can be transmitted to the remote network. The message includes the dynamic telephony addresses assigned by that network, facilitating the process of establishing the communication link for the incoming call. If the location of the wireless communication device is not known, call-setup messages may be multicast to each remote network for which a dynamic telephony address is accessible within the local memory. Locate-wireless-communication-device messages may be multicast or broadcast to remote networks if none or only a portion of the remotely assigned dynamic addresses are accessible within the local memory. Such messages include the device identifier that is specific to the wireless communication device and a request for the dynamic telephony address associated with the device identifier.

In the preferred embodiment, the assignment of a dynamic telephony address to a wireless communication device is not followed by a broadcast of the assigned address to the remaining networks in the internetwork. Resources of the internetwork and the individual networks are conserved by communicating the different dynamic telephony addresses on an as-needed basis. However, with each communication of dynamic telephony addresses, the addresses are stored in local memory.

DETAILED DESCRIPTION

Figure 1:
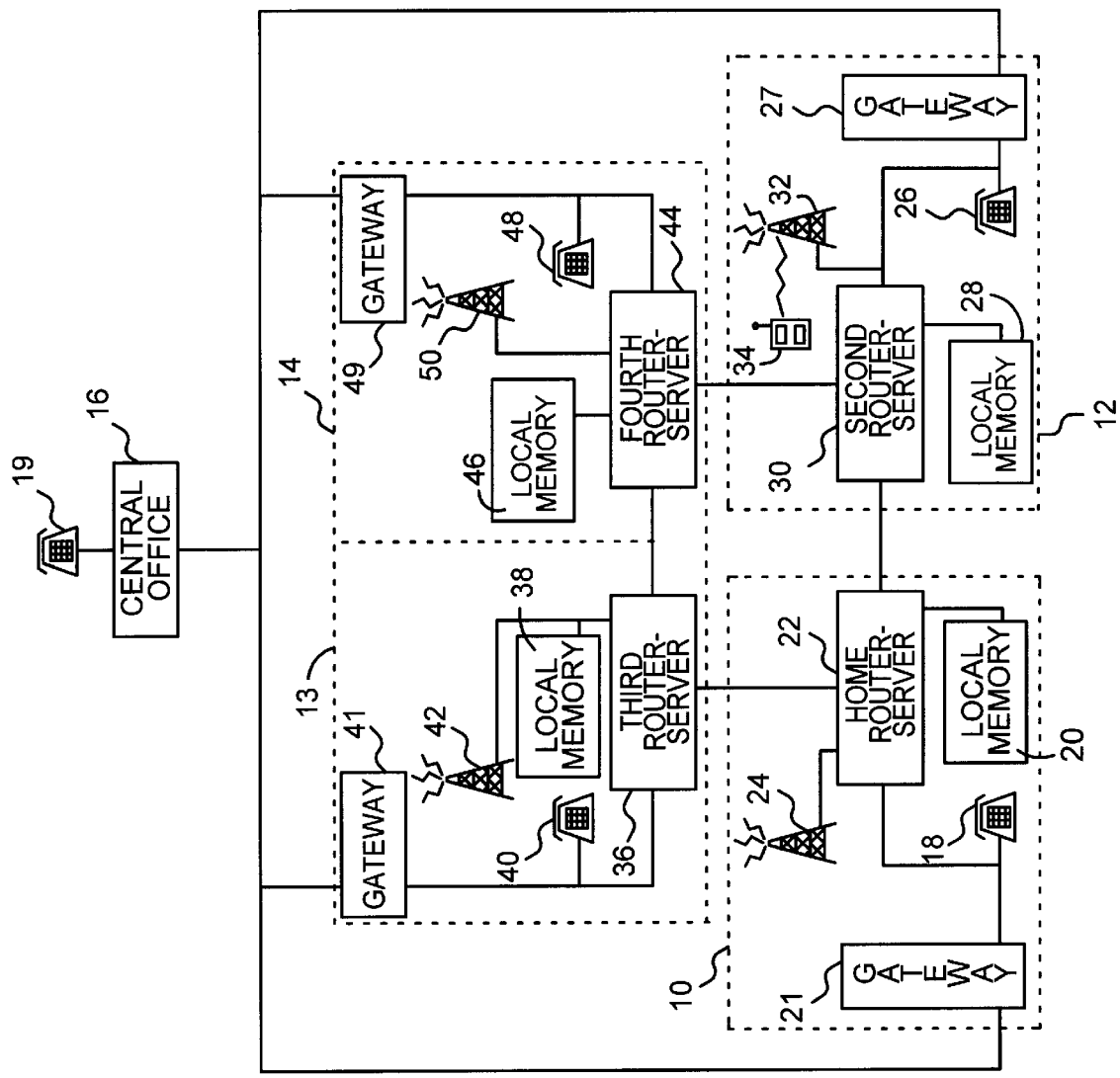
FIG. 1 is a block diagram of a system supporting wireless communication among interconnected networks of an internetwork.

With reference to FIG. 1, a system for supporting wireless communication among multiple interconnected networks includes a home network 10 such as a 10 Base-T local area network (LAN) connected to a second LAN 12, a third LAN 13, and a fourth LAN 14. Each LAN includes its own router-server and wireless base station. Each router-server is equipped with the same capabilities for establishing wireless communication links. The home LAN 10 includes a home local memory 20, a home router-server 22, a home IP telephone 18, a home gateway 21, and a home wireless base station 24. The second LAN 12 includes a second local memory 28, a second router-server 30, a second IP telephone 26, a second gateway 27, and a second wireless base station 32. The third LAN 13 includes a third local memory 38, a third router-server 36, a third IP telephone 40, a third gateway 41, and a third wireless base station 42. The fourth LAN 14 includes a fourth local memory 46, a fourth router-server 44, a fourth IP telephone 48, a fourth gateway 49, and a fourth wireless base station 50.

Each router-server 22, 30, 36 and 44 is capable of uniquely assigning a dynamic IP-telephony address to a particular wireless communication device 34, such as a cellular phone. For example, when the cellular phone 34 is within a generally defined transmission range of the second wireless base station 32, as illustrated in FIG. 1, and the cellular phone 34 performs a specified function, for instance powering up, the cellular phone 34 automatically transmits a registration signal including a registration request to the second router-server 30. The registration signal also includes a cellular phone identifier associated with the cellular phone 34. Unlike the dynamic IP-telephony address, the phone identifier is universally applied to the cellular phone by the LANs 10, 12, 13 and 14.

Figure 3:
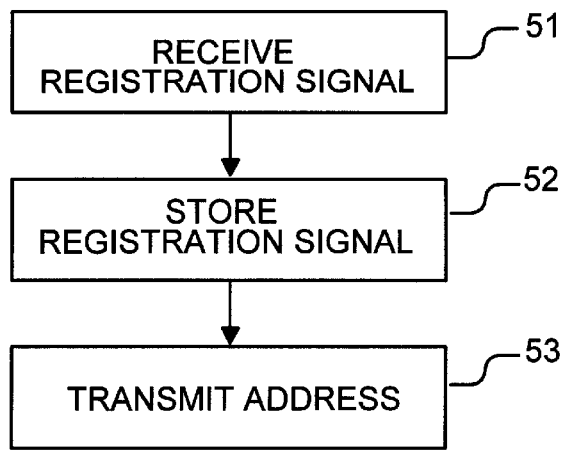
FIG. 3 is a process flow of a method for registering a wireless communication device.

Referring briefly to FIG. 3, a method for registering the cellular phone includes the step 51 of receiving a registration signal at a router-server, such as the second router-server 30. Upon receiving the registration signal having the universally applied phone identifier, the second router-server 30 assigns a second dynamic IP-telephony address to the cellular phone 34. This second dynamic IP-telephony address is different from the first dynamic IP-telephony address assigned to the cellular phone at the home LAN 10. The second router-server 30 enters the identifier and the address into the second local memory 28 in step 52 and transmits the second dynamic IP-telephony address to the cellular phone 34 in step 53. The cellular phone 34 enters the address into a cellular phone local memory (not shown). Thus, the cellular phone may store a number of different addresses that are assigned to it.

Returning to FIG. 1, once the cellular phone 34 has registered with the second router-server 30, the second router server 30 is able to independently establish a connection between the cellular phone 34 and other communication devices, such as the second IP telephone 26 or the remotely located telephone 19. That is, the second LAN 12 is able to function as a "temporary home" LAN for calls that are intended for the cellular telephone 34 and that are linked directly through the second router-server 30. Provided that the cellular telephone 34 is within the transmission range of the second wireless base station 32, the second router-server 30 is capable of establishing the wireless communication link between the cellular telephone 34 and the second IP telephone 26 without accessing registration data from a source outside of the second LAN 12, such as the home LAN 10. The second router-server 30 locally accesses the second dynamic IP-telephony address from the second local memory 28 in response to the incoming call and transmits a call-setup signal with the second dynamic IP-telephony address to the second wireless base station 32. The second wireless base station 32 wirelessly transmits a call-setup message to the cellular telephone 34 to establish the wireless connection. The second router-server 30 is able to establish a wireless communication link between the cellular telephone 34 and the remotely located telephone 19 in the same manner, provided that the call from the remotely located telephone 19 is directed to the cellular phone 34 via the second gateway 27 and the second router-server 30.

Every router-server 22, 30, 36 and 44 of the internetwork of LANs 10, 12, 13 and 14 is capable of uniquely assigning a dynamic IP-telephony address to the cellular phone 34. Furthermore, after the cellular phone 34 has registered with every router-server, each router-server is capable of establishing a wireless communication link to the cellular phone 34 via its associated wireless base station for calls that originate from within the router-server's LAN. The link is formed without accessing registration data from outside the LAN of the router-server.

The dynamic IP-telephony addresses enable the LANs 10, 12, 13 and 14 to use single-cast, multicast and broadcast approaches to efficiently locate the cellular phone 34 when the cellular phone 34 is within a transmission range of a wireless base station located on a remote LAN. As an example, it may be assumed that the user of the cellular phone is also the user of the third IP telephone 40 and that the remotely located telephone 19 has placed a call to the third IP telephone 40 on the third LAN 13 via the third gateway 41. The cellular phone 34 was previously registered with the third router-server 36, which stored a third registration data set, that included a third dynamic IP-telephony address assigned to the cellular phone 34 and included the universally applied cellular phone identifier. It is also assumed that the third IP telephone 40 is programmed to time-out transfer the call to the third router-server 36 after a predetermined interval and to transmit instructions directing the third router-server 36 to relay the call to the cellular phone 34.

At the expiration of the time-out interval, the third router-server 36 will transmit a call-setup signal that includes the third dynamic IP-telephony address to the third wireless base station 42 in an attempt to establish the wireless connection between the remotely located telephone 19 and the cellular phone 34. However, the attempt to establish the connection will not succeed, since the cellular phone 34 is not located in the transmission range of the third wireless base station 42. To establish the connection, the third router-server 36 must obtain the second dynamic IP-telephony address assigned to the cellular phone 34 by the second router-server 30, because the cellular telephone 34 is within the transmission range of the second wireless base station 32.

The third router-server 36 determines whether it has locally stored any dynamic IP-telephony addresses assigned to the cellular telephone by one of the remote router-servers 22, 30 and 44 located on one of the other LANs 10, 12 and 14 of the internetwork. If the third router-server 36 determines that it has not stored any dynamic IP-telephony addresses received from one of the remote router-servers, the third router-server 36 broadcasts a locate-wireless-communication-device message which includes instructions to return a dynamic IP-telephony address. For purposes of discussion, assume that the third router-server 36 determines that it has received no cellular phone dynamic IP-telephony addresses from any of the router-servers on the internetwork and that the wireless telephone 34 has registered with the second router-server 30 only.

The third router-server 36 broadcasts the locate-wireless-communication-device message to the home, second, and fourth router-servers 22, 30, and 44. Only the second router-server 30 responds, because the cellular phone 34 has not registered with any other router-server. The second router-server 30 transmits the second dynamic IP-telephony address to the third router-server 36. The third router-server 36 responds by locally storing the second dynamic IP-telephony address and transmitting a call-setup request to the second router-server 30, including the second dynamic IP-telephony address. The second router-server 30 responds to the call-setup request by transmitting a call-setup signal to the second wireless base station 32, which completes the wireless link between the cellular phone 34 and the remotely located telephone 19.

As a modification of the example above, assume that the cellular phone 34 has now registered with the home, third, and fourth router-servers 22, 36, and 44 in addition to the second router-server 30, but that only the second router-server 30 has transmitted a dynamic IP-telephony address to the third router server 36. The third IP telephone 40 may receive a second call from the remotely located telephone 19. When the time-out interval expires, the second call will be transferred to the third router-server 36 to be relayed to the cellular phone 34. After the localized attempt fails, the third router-server 36 locally accesses the second dynamic IP-telephony address and transmits a call-setup message to the second router-server 30. Again, the call-setup message includes the second dynamic IP-telephony address.

Additionally, the third router-server 36 may multicast the locate-wireless-communication-device message to the home and fourth router-servers 22 and 44, if the third router-server has not been programmed to automatically forward the incoming call to the second network 12. This message includes the universally applied cellular phone identifier, but cannot include the dynamic IP-telephony addresses assigned to the cellular phone by the home and fourth LANs. The home router-server 22 responds to the locate-wireless-communication-device message by transmitting a first dynamic IP-telephony address and the fourth router-server 44 responds by transmitting a fourth dynamic IP-telephony address to the third router-server 36. Upon receiving the first and fourth dynamic IP telephony addresses, the third router-server 36 locally stores the first and fourth dynamic IP-telephony addresses in the third local memory 38 and transmits a call-setup request with the first and fourth dynamic IP-telephony addresses to the home router-server 22 and the fourth router-server 44. The home and fourth router-servers 22 and 44 respond to the call-setup request by transmitting call-setup signals to their associated wireless base stations.

Figure 2:
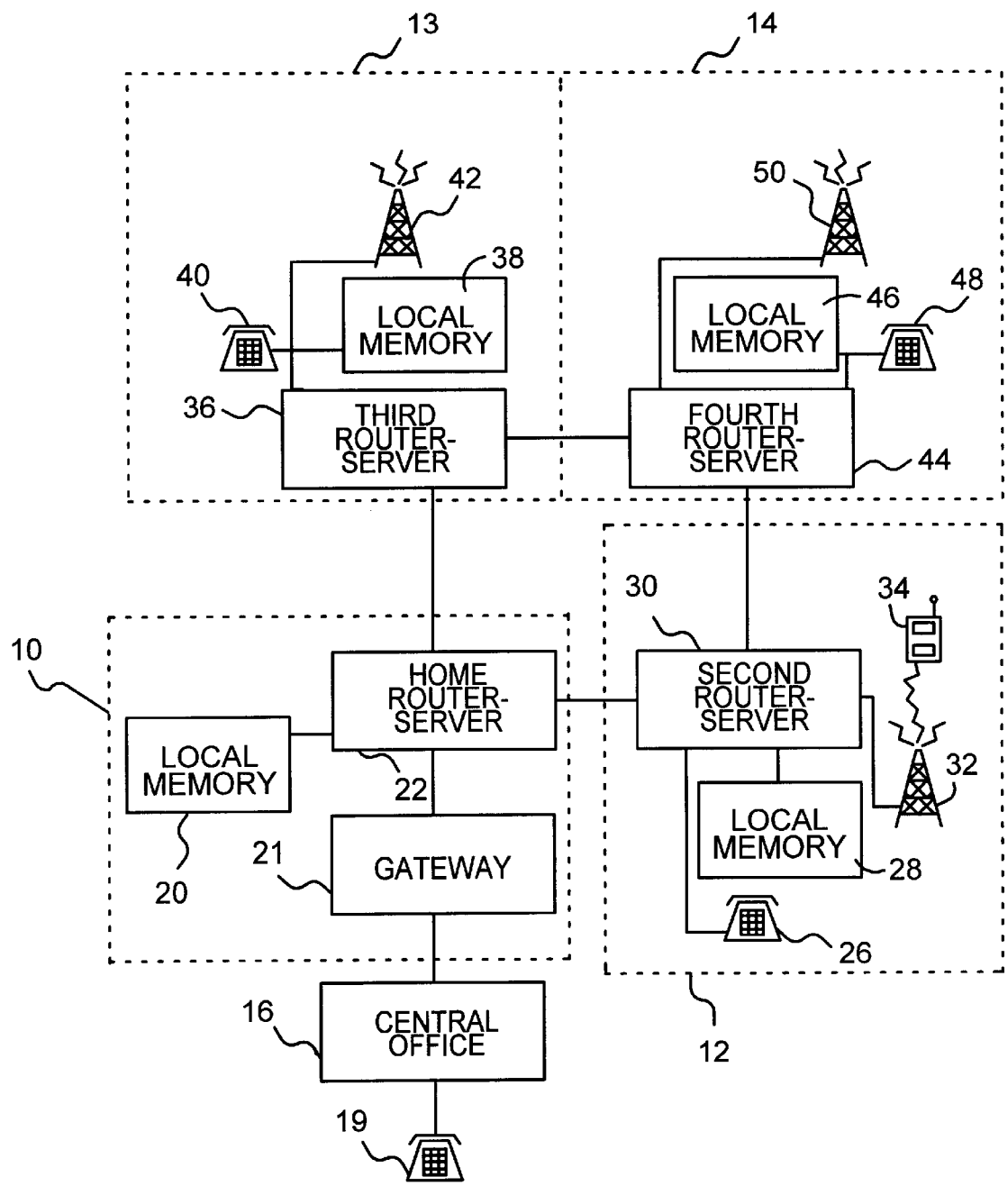
FIG. 2 is a block diagram of an alternative embodiment of the system supporting wireless communications shown in FIG. 1.

One of the advantages of the embodiment of the system illustrated in FIG. 1 is the decentralized routing within the internetwork. Each router-server of the network has equal call-setup capabilities. In contrast, the embodiment illustrated in FIG. 2 provides a home router-server 22 which is dedicated to establishing wireless connections to wireless communication devices for calls received from outside of the internetwork, for example from the remotely located telephone 19 via the central office 16. The second 30, third 36, and fourth 44 router-servers are capable of establishing calls internal to the network. The home router-server 22 stores the identifier of all wireless communication devices located on the internetwork. The home network router-server 22 is configured to broadcast a locate-wireless-communication-device message in response to an incoming call directed to the cellular phone 34. This message includes the identifier of the cellular phone 34. Just as in the embodiment shown in FIG. 1, all router-servers with which the cellular phone 34 has registered are configured to transmit a unique dynamic IP address to the home router-server 22 in response to the locate-wireless-communication-device message.

The advantage provided by employing the home router-server 22 as a dedicated external telephone network router-server is that the other router-servers 30, 36 and 44 of the internetwork are relieved of the burden of routing incoming calls from the external telephone network.

Additionally, the call-forwarding feature of the first embodiment in FIG. 1 can still be employed in the second embodiment. For instance, a call received from the remotely located telephone 19 is directed to the fourth remote telephone 48 via the central office 16 and the home router-server 22.

The fourth remote telephone 48 has a ringer time-out feature whereby the fourth remote telephone 48 transmits a call relay setup request to the fourth router-server 44 after a predetermined number of rings. The fourth router-server 44 is configured to locally access the fourth dynamic IP-telephony address assigned to the cellular phone 34 by the fourth router-server 44, and to determine whether any dynamic IP-telephony addresses assigned to the cellular phone 34 by remote router-servers 22, 30 and 36 are locally stored on the fourth network 14. The fourth router-server 44 will broadcast a locate-wireless-communication-device message if no such address is found. If at least one dynamic IP-telephony address is found, the fourth router-server 44 transmits a call-setup message, including the dynamic IP-telephony address, to the router-server which assigned the cellular phone that address. If any router-servers have not assigned the cellular phone 34 a dynamic IP-telephony address stored locally in the fourth local memory 46, the fourth router-server 44 multicasts the locate-wireless-communication-device message to those router-servers. In this manner, the fourth router-server is able to access dynamic IP-addresses in order to forward a call to the cellular phone 34.

Figure 4:
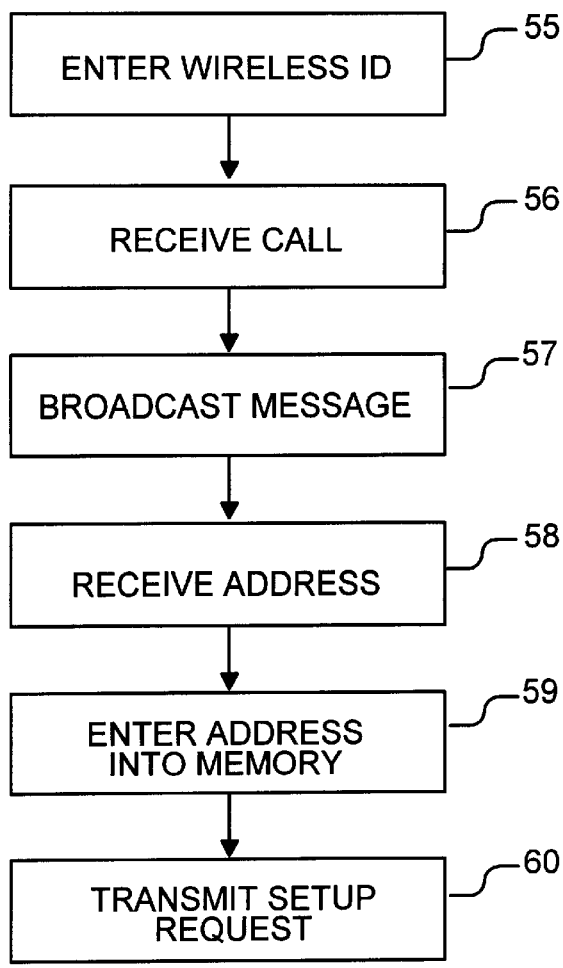
FIG. 4 is a process flow of a method for supporting wireless communication.

Turning to FIG. 4, a method for establishing a wireless communications link to the cellular phone 34 from a router-server, such as the third router-server 36, which has no local access to a dynamic IP-telephony address assigned to the cellular phone 34 includes the step 55 of entering a cellular phone identifier into the third local memory 38. The cellular phone identifier is utilized by the third router-server 36 to process a dynamic IP-telephony address assigned to the cellular phone 34. In step 56, an incoming call which is directed to the cellular phone 34 is received at the third LAN 13. The call can be either a direct call to the cellular phone 34 via the third router-server 36, or the call might be forwarded from the third IP telephone 40.

The third router-server 36 accesses the cellular phone identifier from the third local memory 38. The identifier is incorporated into a locate-wireless-communication-device message broadcasted by the third router-server 36 in step 57. The message, which is broadcasted to the home, second and fourth router-servers 22, 30, and 44, includes instructions to the router-servers to return an IP-telephony address uniquely assigned to the cellular phone 34. The router-servers which have assigned a dynamic IP-telephony address to the cellular phone 34 utilize the cellular phone identifier in the locate-wireless-communication-device message to access the dynamic IP-telephony address stored in local memory. Assuming each router-server in FIG. 1 has assigned a dynamic IP-telephony address to the cellular phone 34, the third router-server 36 receives a home, second and fourth dynamic IP_telephony address in step 58.

In step 59, the third router-server 36 enters the home, second and fourth dynamic IP-telephony addresses into the third local memory 38 for a more efficient call-setup process for future calls directed to the cellular phone 34. Once the third router-server 36 has locally stored all of the IP-telephony addresses assigned to the cellular phone 34 by the router-servers 22, 30 and 44 in the internetwork, it is no longer necessary to transmit locate-wireless-communication-device messages. The third router-server 36 can locally access the dynamic IP-telephony addresses and transmit call-setup messages which include the appropriate IP-telephony addresses to the router-servers to establish a wireless communication link to the cellular phone 34.

In step 60, the third router-server 36 transmits a call-setup request including the IP telephony addresses to the home, second and fourth router-servers 22, 30 and 44. As previously discussed, the router-servers cause their associated wireless base stations to wirelessly transmit a call-setup message in response to the call-setup request.

Figure 5:
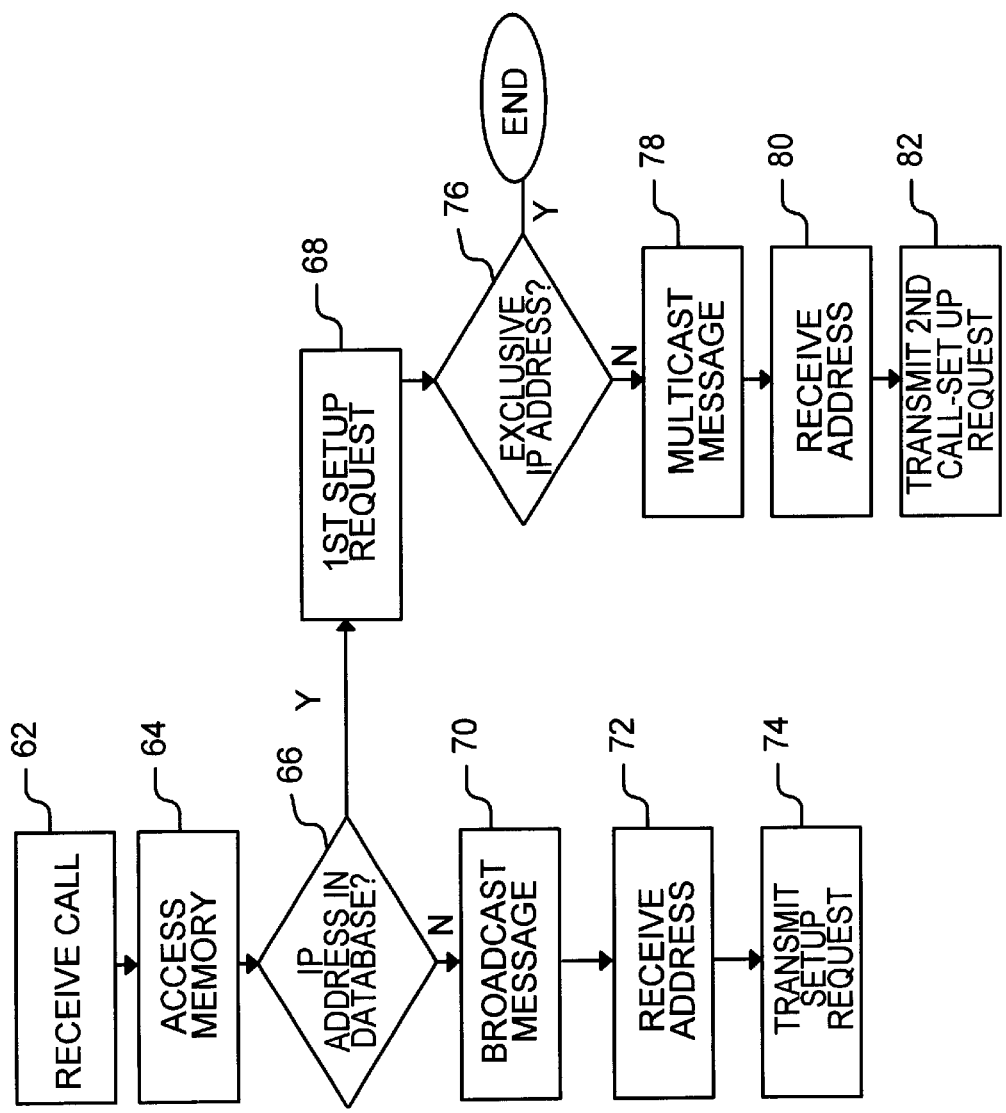
FIG. 5 is a process flow of an alternative embodiment of the method illustrated in FIG. 4.

Referring to FIG. 5, a method for establishing a wireless communication link to the cellular phone 34 from a router-server, such as the homer router-server 22, includes the step 62 of receiving a second incoming call directed to the cellular phone 34. If the cellular phone is not accessible within the home LAN 10, the home router-server 22 accesses local memory 20 in step 64 to determine in step 66 whether dynamic IP-telephony addresses assigned to the cellular phone 34 by remote LANs are stored in the memory. If no dynamic IP-telephony address is stored, the home router-server 22 broadcasts a locate-wireless-communication-device message, receives at least one IP-telephony address from at least one router-server on the internetwork, and transmits a call-setup request to each responding router-server in steps 70, 72, and 74.

In step 68, if the home router-server 22 has previously locally stored at least one dynamic IP-telephony address assigned to the cellular phone 34 by remote LANs, the home router-server 22 transmits a call-setup request to each router-server for which a dynamic IP-telephony address is known. Each of the call-setup requests includes the relevant dynamic IP-telephony address. In step 76, the home router-server determines whether the IP-telephony address stored in the local memory is an "exclusive" address. An exclusive IP-telephony address is stored with data indicating that a particular router-server is the only router-server to which a call-setup request is to be transmitted. The exclusive IP-telephony address can be utilized when a cellular phone user intends to forward calls to a particular network in which the user's cellular phone is known to be located. If the IP-telephony address transmitted by the home router-server 22 in the call-setup request is determined to be an exclusive IP address, no further steps are taken.

If the known dynamic IP-telephony address is determined not to be an exclusive address, in step 78 the home router-server 22 multicasts the locate-wireless-communication-device message to those router-servers in the internetwork which have not previously transmitted a cellular phone dynamic IP-telephony address to the home router-server 22. The home router-server 22 receives at least one cellular phone IP-telephony address from at least one router-server within the internetwork in step 80. The home router-server 22 then transmits a second call-setup request to each responding router-server in step 82. Each call-setup request includes the relevant cellular phone dynamic IP-telephony address.

What is claimed is:

1. A system for supporting communications within an internetwork, including communications involving wireless communication devices that are relocatable among transmission regions of said internetwork, comprising:

first, second and third networks that are interlinked to at least partially form said internetwork, said networks being linked networks of a single business enterprise, each said network including:

(a) a base station having a generally fixed transmission region with respect to supporting communications with said wireless communication devices; and (b) a call control means cooperative with said base station for establishing communication links and for assigning a dynamic internetwork protocol telephony address to each wireless communication device from which a device identifier is received via said base station, said device identifier being specific to said each wireless communication device, said assigned dynamic telephony address having a unique association with said each wireless communication device within said each network and said unique association being independent of assigned dynamic telephony addresses to said each wireless communication device in other networks of said first, second and third networks, wherein each said call control means of said first, second and third networks is configured to transmit an internetwork locate-wireless-communication-device message in response to determining (1) that a dynamic telephony address assigned by another said call control means is unavailable for a particular said wireless communication device to which an incoming call is to be directed and (2) that said particular wireless communication device is outside of said generally fixed transmission region of said base station with which said each call control means is cooperative, and wherein said internetwork locate-wireless-communication-device message includes said device identifier that is specific to said particular wireless communication device and includes a request for dynamic telephone addresses assigned to said particular wireless communication device by other said call control means.

2. The system of claim 1 wherein said call control means of each said network is a router-server and said dynamic telephony address is an internet protocol (IP) telephony address, said wireless communication devices including cellular telephones.

3. The system of claim 1 wherein each said first, second and third network includes local memory means for storing dynamic telephony addresses assigned to said wireless communication devices, each local memory means having stored data representative of associations between each said device identifier and dynamic telephony addresses assigned by selected networks to the wireless communication device to which said each device identifier is specific, said selected networks including a local network in which said local memory means is included and further including any remote network from which said local network receives a dynamic telephony address assigned by said remote network.

4. The system of claim 3 wherein each call control means is further configured to transmit call-setup requests to first remote networks when said incoming call is directed to said remotely located wireless communication device via said call control means, said first remote networks being networks for which said each call control means has local memory access to dynamic telephony addresses assigned to said remotely located wireless communication device by said first remote networks, each call-setup request that is transmitted to one of said first remote networks containing the dynamic telephony address assigned to said remotely located wireless communication device by said first remote networks.

5. The system of claim 1 wherein each network includes a stored registration set for each wireless communication device to which a dynamic telephony address has been assigned by said each network, said stored registration set including said device identifier specific to said each wireless communication device and including all known dynamic telephony addresses assigned to said each wireless communication device.

6. A method for supporting wireless communications within an internetwork comprising steps of:

(a) detecting a presence of a first wireless device within a territorial region of a first network that is specific to supporting connectivity with a plurality of wireless devices within said territorial region;

(b) assigning a first dynamic internetwork protocol telephony address to said first wireless device, including selecting said first telephony address independently of telephony addresses assigned to said first wireless device by remote networks of said internetwork, where each said remote network is specific to supporting connectivity with said wireless devices when said wireless devices are in territorial regions supported by said remote networks;

(c) detecting incoming calls directed to said first wireless device via said first network;

(d) for each incoming call, determining whether said first wireless device is within said territorial region of said first network;

(e) establishing connectivity for said incoming calls using resources of said first network if said first wireless device is within said territorial region;

(f) determining dynamic internetwork protocol telephony addresses assigned to said first wireless device by said remote networks if said first wireless device is outside said territorial region; and (g) transmitting call-setup messages to remote networks for which a dynamic telephony address has been assigned to said first wireless device and communicated to said first network, each call-setup message that is transmitted to a particular remote network having the dynamic telephony address assigned to said first wireless device by said particular remote network, each call-setup message being configured to initiate connectivity for said each incoming call.

7. The method of claim 6 further comprising applying steps (a) through (g) for each of a plurality of second wireless devices.

8. The method of claim 6 further comprising a step (h) of transmitting a locate-wireless-communication-device message to each remote network for which a dynamic telephony address has not been communicated to said first network.

9. The method of claim 6 wherein said step (b) of assigning said first dynamic telephony address is implemented in each of said remote networks such that said first wireless device has a different dynamic telephony address in each network in which said first wireless device has been assigned a dynamic telephony address.

10. The method of claim 6 further comprising a step of storing each dynamic telephony address assigned to said first wireless device by said remote networks.

11. A system for supporting wireless communication among networks in an internetwork comprising:

a home router-server located on a home network supporting wireless communication, said home router-server being configured to establish a wireless communication link between telephonic devices and a wireless communication device that is associated with a first IP-telephony address uniquely assigned by said home network, said home router-server being configured to remotely broadcast a locate-wireless-communication-device command including a device identifier in response to an incoming call from one of said telephonic devices to said wireless communication device, said device identifier being specific to said wireless communication device, said locate-wireless-communication-device message including a request for at least one remotely assigned dynamic IP-telephony address assigned to said wireless communication device by a remote network, said home router-server being further configured to remotely transmit at least one call-setup request including a known remotely assigned dynamic IP-telephony address;

a second network linked to said home network to exchange messages and requests, said second network including a second router-server configured to transmit a second dynamic IP-telephony address as one of said remotely assigned dynamic IP-telephony addresses in response to said locate-wireless-communication-device message from said home router-server, said second router-server being further configured to establish a wireless communication link with said wireless communication device via a second wireless base station supported by said second network if said wireless communication device is within a transmission range of said second wireless base station; and a third network linked to said home network and said second network to exchange messages and requests, said third network including a third router-server configured to transmit a third dynamic IP-telephony address as one of said remotely assigned dynamic IP-telephony addresses in response to said locate-wireless-communication-device message from said home router-server, said third router-server being further configured to establish a wireless communication link with said wireless communication device via a third wireless base station supported by said third network if said wireless communication device is within a transmission range of said third wireless base station.

12. The system of claim 11 wherein said second router-server is configured to assign said second dynamic IP-telephony address to said wireless communication device in response to a registration request transmitted by said wireless communication device via said second wireless base station, said registration request including said device identifier that is specific to said wireless communication device, said third router-server being configured to assign said third dynamic IP-telephony address to said wireless communication device in response to a second registration request that includes said device identifier and that is transmitted by said wireless communication device via said third wireless base station.

13. The system of claim 12 further comprising local memory on said home network including said device identifier, said home router-server being configured to access said device identifier to be included in said locate-wireless-communication-device message, said home router-server being further configured to store said second and third dynamic IP-telephony addresses upon receiving said second and third dynamic IP-telephony addresses from said second and third router-servers.

14. The system of claim 12 further comprising a home wireless base station located in said home network, said home router-server being configured to transmit a call-setup signal including said first dynamic IP-telephony address to said home wireless base station, said wireless base station being configured to transmit a first wireless call-setup signal having information enabling establishment of a wireless communication link if said wireless communication device is within a transmission range of said home wireless base station.

15. A system for supporting communications within an internetwork, including communications involving wireless communication devices that are relocatable among transmission regions of said internetwork, comprising:

first, second and third networks that are interlinked to at least partially form said internetwork, each said network including:
(a) a base station having a generally fixed transmission region with respect to supporting communications with said wireless communication devices; and
(b) a call control means for establishing communication links and for assigning a dynamic internetwork protocol telephony address to each wireless communication device from which a device identifier is received via said base station, said device identifier being specific to said each wireless communication device, said assigned dynamic telephony address having a unique association with said each wireless communication device within said each network and said unique association being independent of assigned dynamic telephony addresses to said each wireless communication device in other networks of said first, second and third networks, each said call control means being configured such that:
(1) said each call control means is enabled to transmit call-setup requests to first remote networks when an incoming call is directed to a remotely located wireless communication device via said each call control means, said remotely located wireless communication device being outside the generally fixed transmission region of the network in which said each call control means is included, said first remote networks being networks for which said each call control means has local memory access to dynamic telephony addresses assigned to said remotely located wireless communication device by said first remote networks; and
(2) said each call control means is further enabled to transmit a locate-wireless-communication-device message to second remote networks for which local memory access to a dynamic telephony address is unavailable when said incoming call is directed to said remotely located wireless communication device, said locate-wireless-communication-device message including said device identifier that is specific to said remotely located wireless communication device and including a request for dynamic telephony addresses assigned to said remotely located wireless communication device by said second remote networks.

* * * * *